United States Patent
Stal et al.

(10) Patent No.: US 12,481,870 B2
(45) Date of Patent: Nov. 25, 2025

(54) METHOD FOR DETERMINING A QUALITY GRADE OF DATA SETS OF SENSORS

(71) Applicant: Robert Bosch GmbH, Stuttgart (DE)

(72) Inventors: Rainer Stal, Sindelfingen (DE); Christian Haase-Schuetz, Fellbach (DE); Heinz Hertlein, Erlenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 845 days.

(21) Appl. No.: 17/063,388

(22) Filed: Oct. 5, 2020

(65) Prior Publication Data
US 2021/0117787 A1  Apr. 22, 2021

(30) Foreign Application Priority Data
Oct. 16, 2019 (DE) .......................... 102019215902.8

(51) Int. Cl.
*G06N 3/08* (2023.01)
*B60Q 9/00* (2006.01)
(Continued)

(52) U.S. Cl.
CPC ................ *G06N 3/08* (2013.01); *B60Q 9/00* (2013.01); *B60R 16/0231* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 10,730,181 B1 * | 8/2020 | Rajkumar | .............. G06N 20/00 |
| 2014/0032012 A1 * | 1/2014 | Joshi | ...................... G01S 13/931 |
| | | | 701/1 |

(Continued)

FOREIGN PATENT DOCUMENTS

| | | |
|---|---|---|
| CN | 109059927 A | 12/2018 |
| CN | 109284785 A | 1/2019 |

(Continued)

OTHER PUBLICATIONS

"What is a Multi-Layer Neural Network" (Year: 2019).*
(Continued)

*Primary Examiner* — Michael J Huntley
*Assistant Examiner* — Paul J Breene
(74) *Attorney, Agent, or Firm* — NORTON ROSE FULBRIGHT US LLP (57) ABSTRACT

A method for training a machine learning model for determining a quality grade of data sets from each of a plurality of sensors. The sensors are configured to generate surroundings representations. The method includes: providing data sets of each of the sensors from corresponding surroundings representations; providing attribute data of ground truth objects of the surroundings representations; determining a quality grade of the respective data set of each of the sensors using a metric, the metric comparing at least one variable, which is determined using the respective data set, with at least one attribute datum of at least one associated ground truth object of the surroundings representation; and training the machine learning model using the data sets of each of the sensors and the respectively assigned determined quality grades.

16 Claims, 1 Drawing Sheet

(51) Int. Cl.
 B60R 16/023 (2006.01)
 G06N 3/04 (2023.01)

(56) References Cited

U.S. PATENT DOCUMENTS

| | | | | |
|---|---|---|---|---|
| 2017/0123428 A1* | 5/2017 | Levinson | ............. | G05D 1/0257 |
| 2020/0025931 A1* | 1/2020 | Liang | ................... | G06F 18/251 |
| 2020/0320871 A1* | 10/2020 | Massarano | ........... | G08G 1/0145 |

FOREIGN PATENT DOCUMENTS

| | | |
|---|---|---|
| CN | 109978005 A | 7/2019 |
| DE | 102008001672 A1 | 11/2009 |
| DE | 102017213692 A1 | 2/2019 |

OTHER PUBLICATIONS

"The Curse of Big Data Labeling" (Year: 2018).*
"Epoch vs Batch Size vs Iterations" (Year: 2017).*
"Concatenation definition and meaning" (Year: 2018).*
"Modalities," Merriam-Webster Dictionary, 2023 (Year: 2024).*
"Multi-View 3D Object Detection Network for Autonomous Driving," arXiv, 2017, Chen et al; Chen, (Year: 2017).*
"A Reliability-Based Method to Sensor Data Fusion," Sensors, 2017 Wen et al; Wen, (Year: 2017).*
"Fast R-CNN," 2015 IEEE International Conference on Computer Vision, Girshick at al; Girshick. (Year: 2015).*
Kim, T. and J. Ghosh, "Robust Detection of Non-Motorized Road Users Using Deep Learning on Optical and Lidar Data," in Intelligent Transportation Systems (ITSC), 2016, pp. 271-276.
Chen, X. et al. "Multi-View 3D Object Detection Network for Autonomous Driving," in Computer Vision and Pattern Recognition (CVPR), Cornell University, 2017, pp. 1-9. ARXIV:1611.07759V3, Downloaded on Nov. 6, 2020.
Ku, J. et al., "Joint 3D Proposal Generation and Object Detection From View Aggregation," Cornell University, 2018, pp. 1-8. ARXIV:1712.02294V4, Downloaded on Nov. 6, 2020.
Qi, Charles R., et al., "Frustum Pointnets for 3D Object Detection From RGB-D Data," in Computer Vision and Pattern Recognition (CVPR), Cornell University, 2018, pp. 1-15. ARXIV:1711.08488V2, Downloaded on Nov. 6, 2020.

* cited by examiner

Fig. 1

- S0 — generate data sets
- S1 — provide data sets of each of the multi-modal sensors
- S2 — provide multitude of surroundings representations
- S3 — determine quality grades
- S4 — train or optimize machine learning model

Fig. 2

METHOD FOR DETERMINING A QUALITY GRADE OF DATA SETS OF SENSORS

CROSS REFERENCE

The present application claims the benefit under 35 U.S.C. § 119 of German Patent Application No. DE 102019215902.8 filed on Oct. 16, 2019, which is expressly incorporated herein by reference in its entirety.

FIELD

The present invention relates to a method for training a machine learning model for determining a quality grade of data sets of sensors and to a method for determining a quality grade of data sets of sensors.

BACKGROUND INFORMATION

The implementation of the perception or representation of the surroundings (perception) is of great importance in terms of implementing an at least semi-automated driving, but also increasingly for driving assistance systems. The surroundings in this case are detected with the aid of sensors and, for example, identified using methods of pattern recognition.

Thus, the data of the sensors are converted into a symbolic description of relevant aspects of the surroundings. This symbolic description of the surroundings then forms the basis for carrying out actions in the surroundings thus described or for an application or intended use of an, for example, at least semi-automated mobile platform. A typical example of a symbolic description of the surroundings is to describe static and dynamic objects with the aid of attributes, which characterize, for example, the position, form, size, velocity etc. of the respective object. The objects may, for example, be obstacles with which a collision must be avoided.

This surroundings perception is frequently based on a combination or fusion of data of multiple sensors of different modalities. Thus, for example, different sensor types, such as optical cameras, RADAR systems, LIDAR systems and ultrasonic sensors may be combined to form a multimodal sensor set.

Fields of view of some of the different sensors of various modalities may overlap in this case in such a way that sensor data from at least two different modalities may always be present within the field of view relevant for the application. This has the advantage that deficiencies of individual sensors of one modality may, in principle, be compensated for by other sensors of another modality. For example, in the case of a combination of an optical camera and a RADAR system, the restricted view of the optical camera in fog may be mitigated by the perception of objects with the aid of radar measurements.

SUMMARY

In order to mitigate sensor deficiencies within the scope of sensor data fusion, different methods may be applied. Thus, it may be sufficient, for example, in particular applications to only optimize with respect to the false-positive rate or only to the false-negative rate of a detection of an object.

If, for example, the most important criterion in a robot operated in an at least semi-automated manner is to avoid collisions in the at least semi-automated mode, whereas when identifying false-positive objects (ghosts) after a stop of the robot, a manual control is able to be carried out, then the module for the sensor data fusion and surroundings perception (MSFU) may be optimized with respect to the avoidance of false-negative detections. In simple terms, an object is assumed to be real during such an optimization if it is perceived by at least one of the sensor modalities generating the data.

If in this case, one of the sensors does not identify an object (false-negative), whereas another sensor modality is not affected by this erroneous detection, the deficiency of the first sensor is successfully mitigated by the other sensor modality. An error results in this method, however, if one of the sensor modalities is affected by a false-positive identification (ghost), because this false-positive identification is not mitigated during this optimization by another modality. This is a disadvantage of present approaches.

Similarly, in the case of an automatic emergency braking (AEB), it may be meaningful to optimize the system with respect to the avoidance of false-positives, in that an object is assumed by the module for sensor data fusion and surroundings perception (MSFU) to be real only when it is perceived by all sensor modalities in whose field of view the object is located. In this case as well, present systems have a disadvantage because, due to the optimization with respect to the avoidance of false-positives, a higher rate of false-negative identifications results as compared to the individual sensor modalities.

The described options of present systems for mitigating sensor deficiencies do not utilize any information that specifies which of the sensor modalities are more or less reliable in each case. This at least partially explains the disadvantages mentioned.

A continuous, automatic assessment of a sensor quality is, due to the multitude of different conditions which, per modality, may impact the quality, a problem that is difficult to solve using conventional methods, which is not solved or only insufficiently solved in present methods for representing surroundings.

The present invention provides a method for training a machine learning model for determining a quality grade of data sets of sensors, a method for fusing data sets of sensors, a method for determining a quality grade of a data set of a sensor, as well as a method, a device, a computer program and a machine-readable memory medium. Advantageous embodiments of the present invention are described herein.

In accordance with an example embodiment to the present invention, a machine learning model such as, for example, a neural network, may be trained with the aid of a multitude of data sets of a plurality of sensors of different modality, which have been generated in different surroundings with different conditions, to determine a quality of data sets of a sensor of the plurality of the sensors in specific surroundings of sensors.

According to one aspect of the present invention, a method is provided for training a machine learning model for determining a quality grade of at least one data set from each of a plurality of sensors, the plurality of sensors being configured to generate surroundings representations. In accordance with an example embodiment of the present invention, in the method, a multitude of data sets of each of the plurality of the sensors is provided in one step from a corresponding multitude of surroundings representations.

In a further step, attribute data of ground truth objects of the multitude of surroundings representations are provided.

In a further step, a quality grade of the respective data set of each of the plurality of the sensors is determined with the aid of a metric, the metric comparing at least one variable, which is determined with the aid of the respective data set, with at least one attribute datum of at least one associated ground truth object of the surroundings representations. In a further step, the machine learning model including the multitude of, in particular, new data sets of each of the plurality of the sensors and the respectively assigned determined quality grades, is trained to determine a quality grade of at least one data set of each of a plurality of sensors.

According to one aspect of the present invention, it is provided that the machine learning model is trained in that in a multitude of training steps the machine learning model is provided with the data sets of the multitude of data sets of each of the multitude of the sensors as an input signal and the respective quality grades as a target output, in order to achieve the adaptation of the machine learning model to this training sample, which includes the data sets and respective quality grades.

After completion of this training carried out in multiple iterations, the machine learning model is configured to provide an output variable for outputting a prediction of the quality grade of each individual data set of each of the plurality of the sensors, if the machine learning model is provided with a new data set of each of the sensors as an input signal.

In this entire description of the present invention, the sequence of method steps is represented in such a way that the method is easily comprehensible. Those skilled in the art, however, will recognize that many of the method steps may also be run through in a different order and lead to the same result. In this context, the order of the method steps may be changed accordingly and is therefore also described.

In this case, static and dynamic objects of the surroundings representation are described with the aid of attributes, the attributes relating, for example, to a spatial position of an object, to a form, to a size or to a velocity of the respective object.

Data sets may originate, for example, from sensors of different modalities, which are individually or jointly configured to generate surroundings representations. Examples of sensors of different modalities or different sensor types may be optical cameras, RADAR systems, LIDAR systems or ultrasonic sensors, which may be combined to form a multimodal sensor set.

A plurality of sensors may encompass a small number of sensors, for example two or three sensors, the plurality may also encompass 100 sensors or an even much higher number of sensors may form the plurality of sensors.

The reference to ground truth object or ground truth surroundings representation is understood here to mean that these specifications of an object or of surroundings represent a reference, which sufficiently accurately describe a reality of the surroundings for the respective purpose. In other words, ground truth objects or surroundings are observed or measured objects or surroundings, which may be objectively analyzed.

The machine learning model is thus trained using a labeled training sample. The labeled sample (quality measure sample) used for training the machine learning model is determined from another labeled sample, for which for a multitude of data sets of a plurality of sensors (surroundings sample), attributes of the ground truth objects of the surroundings representation have been determined and stored in each case.

Since it is possible with the aid of the metric to determine a quality grade from the surroundings sample, this quality grade may be used as a training target for the machine learning model. It is thus a supervised training method.

The machine learning model is provided with the multitude of data sets of each of the sensors of the plurality of the sensors as an input signal; the machine learning model, for example, may be a deep neural network. These data sets of the sensors represent quasi raw measured data of all sensors of the multimodal sensor set, since they have not yet been converted into a description of objects. The output variable of the machine learning model represents an assessment of the quality of the individual sensors with respect to the corresponding surroundings representations.

An advantage of this example method for training the machine learning model using the data sets of the plurality of the sensors, which are not yet converted into objects of the surroundings representation, is that, as a result, the machine learning model may be trained using unconcealed functional connections of the generated sensor data, and the metric for determining the quality, on the one hand, uses the attributes of ground truth objects of the surroundings representation as a reference variable and, on the other hand, may be adapted for the respective modality of the sensor.

Since all sensor data of the multimodal set are processed by the same model, the quality measure of a particular sensor is determined via the model by using the information of not only this sensor, but also of all other sensors. This enhances the reliability of the quality label. As a simple example, the determination of the quality measure for a LIDAR system may include the image of the camera, which shows the weather situation.

Such a quality grade may, for example, include for each sensor of a sensor set a numerical value between zero and one, the value one corresponding to an optimal performance of the sensor, i.e., no sensor deficiencies are present, whereas zero is output if no reliable information has been output by the sensor.

Since the training of a machine learning model depends heavily on the selected machine learning model, such a training is explained here using an example of a deep neural network.

A neural network provides a framework for many different algorithms for machine learning, for cooperating and for the processing of complex data inputs. Such neural networks learn to carry out tasks based on examples without typically having been programmed with task-specific rules.

Such a neural network is based on a collection of connected units or nodes, which are referred to as artificial neurons. Each connection may transmit a signal from one artificial neuron to another. An artificial neuron that receives a signal may process the signal and then activate further artificial neurons connected to it.

In conventional implementations of neural networks, the signal at a connection of artificial neurons is a real number, and the output of an artificial neuron is calculated by a non-linear function of the sum of its inputs. The connections of the artificial neurons typically have a weight, which adapts with continuous learning. The weight increases or reduces the strength of the signal at a connection. Artificial neurons may have a threshold, so that a signal is output only when the entire signal exceeds this threshold. A multitude of artificial neurons are typically combined in layers. Different layers potentially carry out different types of transformations for their inputs. Signals migrate from the first layer, the input layer, to the last layer, the output layer, potentially after passing through the layers multiple times.

In the process, the deep neural network is provided with the data sets of the sensors as an input signal and the quality grade is compared as the target variable with the output variable of the neural network.

At the start of the training, such a neural network obtains, for example, a random initial weight for each connection between two neurons. The input data are then input into the network, and each neuron weighs the input signals with its weights and forwards the result to the neurons of the next layer. The overall result is then provided at the output layer. The size of the error may be calculated, as well as the part that each neuron had in this error, and the weights of each neuron then change in the direction which minimizes the error. Further passes, re-measurements of the error, and adaptation of the weights until the error is below a predefined limit then iteratively take place.

According to one aspect of the present invention, it is provided that the machine learning model includes a neural network or a recurrent neural network and the respective output variable is a vector that includes at least one vector element, which specifies the quality grade.

The model of the machine learning method may, for example, be a deep neural network (DNN), which includes multiple hidden layers.

Further machine learning models that may be used for the method are, for example, Linear Discriminant Analysis (LDA) as a trained method for feature transformation, in addition to which Support Vector Machines (SVMs) or Gaussian Mixture Models (GMMs) or Hidden Markov Models (HMMs), for example, may be used as trained classification methods.

When using a feed-forward neural network with the data sets of multimodal sensors, the data sets of a particular time step are processed typically independently of preceding data sets ("single frame processing").

By using recurrent neural networks (RNN), for example, it is possible to also include temporal connections between the data sets of the sensors. The structure of the recurrent neural networks (RNN) may also include Long-Short-Term Memory Cells (LSTM cells), in order to improve the integration of pieces of information over a longer time period, so that these pieces of information may be better incorporated into the instantaneous quality measure estimation.

The architecture of a neural network may be adapted to the different formats such as, for example, a data structure, a data volume and data density, of the different sensor modalities. For example, sensors whose data may be represented per time step as one or multiple two-dimensional matrices such as, for example, image data of a camera, may be advantageously processed using a classic grid-based Convolutional Neural Network (CNN). Other sensors, which provide point clouds per time step such as, for example, LIDAR, may be advantageously processed using architectures such as, for example, PointNet or PointNet++, which are point-based and, in contrast to the grid-based methods, are able to directly process a raw point cloud as an input.

According to one further aspect of the present invention, it is provided that the neural network includes multiple layers, and the data sets of at least two sensors are input separately from one another into different parts of the input layer of the neural network, and a fusion of the data sets of the at least two different sensors takes place in another layer within the neural network.

Depending on the sensor types used of the at least two sensors of the plurality of the sensors, the data sets of the sensors may also be input separately from one another into different parts of the input layer of the neural network, and this fusion may then take place within the neural network ("middle fusion"). If, therefore, the neural network includes multiple layers, a fusion of the respective data seta of at least two sensors of the plurality of the sensors may take place in different layers of the neural network.

The pieces of information of at least two sensors of the plurality of the sensors are, in particular, fused if the data sets of the at least two different sensors are fused, this fusion of the pieces of information of the different sensors being capable of taking place with the aid of a fusion of the data sets of the sensors before the input into the neural network ("early fusion").

According to one further aspect, this fusion may also take place in that the data are separated, are processed by multiple neural networks, and thus are separately identified, and then a fusion of the network outputs, i.e., the object representations, takes place ("late fusion").

In other words, different methods for fusing the data of the sensors of different modalities are considered in order to implement the identification of multimodal data. A fusion of the different sensor modalities may thus take place with the aid of an early, middle, or late fusion. In an early fusion, the multimodal data of the sensors are fused, typically after carrying out suitable transformations and/or a selection of the data (for example, for aligning the field of view), before the input into the input layer of the neural network takes place. In a late fusion, each modality is processed independently of the other modalities by a DNN suitable for this modality and the desired outputs are generated in each case. All outputs are then fused. The fusion therefore takes place both during early fusion as well as during late fusion outside the DNN architecture, during the early fusion before, and during the late fusion after, processing by the DNN or DNNs.

The case of middle fusion differs; here the input of the multimodal data and the processing in some "lower" (i.e., situated close to the input) layers takes place initially separately from one another. The fusing then takes place within the DNN, before the fused and already processed data are further processed in further "upper" (i.e., situated close to the output) layers.

Possible fusion architectures, which may be obtained from the literature are MV3D [1], AVOD [2], Frustum PointNet [3] and Ensemble Proposals [4].

[1] X. Chen et al. "Multi-view 3d object detection network for autonomous driving" in Computer Vision and Pattern Recognition (CVPR), 2017, IEEE Conference on. IEEE, 2017, pp 6526-6534.

[2] J. Ku, et al., "Joint 3d proposal generation and object detection from view aggregation" arXiv:1712.02294, 2017.

[3] C. R. Qi, W. Liu, C. Wu, H. Su, and L. J. Guibas, "Frustum pointnets for 3d object detection from rgb-d data" in Computer Vision and Pattern Recognition (CVPR), 2018 IEEE Conference on. IEEE, 2018.

[4] T. Kim and J. Ghosh, "Robust detection of non-motorized road users using deep learning on optical and lidar data," in Intelligent Transportation Systems (ITSC), 2016, pp. 271-276.

The architectures mentioned here normally have a classification and size estimate of the objects in the field of view as an output. For the present invention provided herein, the architectures and operations of the fusion provided in [1, 2, 3, 4] may be used with the aid of DNNs, in this case, the output layer would have to be adapted accordingly and a regression of the quality measure would have to be calculated with the aid of one or of multiple, for example, fully connected layers.

According to one aspect of the present invention, it is provided that an operation for fusing the respective pieces of information from at least two sensors of the plurality of the sensors takes place with the aid of addition, averaging or concatenation of the data sets of the different sensors and/or of attributes of objects of the surroundings representation determined from the respective data sets of different sensors.

This form of the fusion of the data sets of the different sensors may be used, in particular, with the above-described early fusion. The fusion of output data sets of multiple, modality-specific deep neural networks (DNN) may also take place with the aid of addition, averaging or concatenation, in particular, during a late fusion.

The neural network(s) may be adapted to the respective data structure of the different sensor modality both via the different architectures as well as via the different operations of the fusion, in order to achieve an optimum processing of the data by the neural network.

The neural network for a quality measure regression may be structured in such a way that a single neuron of the output layer is assigned to each scalar output quality value.

As an alternative, the regression may be implemented in such a way that each scalar quality measure is represented by multiple neurons of the output layer. A partitioning of the value range of the quality measure is suitably selected for this purpose.

For example, in a quality measure between 0 and 1, the first of ten partitions may correspond to the range from 0 to 0.1, the second partition may correspond to the range from 0.1 to 0.2 and so forth. The regressed output quality for each individual scalar quality measure g is then implemented by one output neuron each per partition [a; b]. In this case, the desired output value of the respective neuron is equal to one, if the associated partition is completely below the quality value to be represented ($b \leq g$). If the partition associated with the neuron is completely above the quality measure ($g \leq a$), the desired output is equal to zero. The neuron in whose partition the quality measure is situated ($a < g < b$) is to assume the value $((g-a)/(b-a))$.

According to one further aspect of the present invention, it is provided that at least one sensor of the plurality of the sensors generates data sets, which include a temporal sequence of data of the at least one sensor.

Since a typical sensor is able to provide a new value, for example, every 10 ms, sequences of data may also be processed with corresponding structuring of the neural network, and temporal connections may thus be incorporated into the determination of the quality of the respective sensors. For example, 100 sequential data sets each could be provided as an input signal for the neural network.

According to one aspect of the present invention, it is provided that at least two sensors of the plurality of the sensors include different modalities and the metric for the determination of the quality grade is a function of the respective modality of the sensor.

Because the metric for the determination of the quality grade is a function of the respective modality of the sensor, it is possible for the respective determination of the quality to be matched specifically to the corresponding sensor type. This results in a higher accuracy with respect to the specification of a quality grade.

According to one further aspect of the present invention, it is provided that the comparison of the at least one size, that has been determined using the respective data set, takes place with the aid of the metric using in each case at least one attribute datum of at least one associated ground truth object of the surroundings representation.

For a calculation of the quality, the corresponding metric may determine, in particular, distances. In this case, a shorter distance should result according to the metric in a better quality measure and vice versa. Sensor modality-specific properties are to be considered for establishing such a metric.

In a step of comparing, the at least one size of the respective data set of a sensor is associated with at least one ground truth object of the associated surroundings representation.

In one further step of the comparison, a quantitative match of the at least one size with at least one attribute of the ground truth object of the surroundings representation is determined with the aid of a metric as a function of the modality of the sensor for determining the quality grade of the respective data set.

The association of the at least one size of the respective data set of a sensor in this case with at least one ground truth object of the associated surroundings representation takes place with the aid of a further metric, for example, with the aid of a distance measurement of the size of the respective data set from a ground truth object. In other words, this means that a particular size from the measured data set is associated with the object for which a metric, for example, a distance metric, is the smallest. A threshold value for the metric is also defined which, depending on the metric, must be undercut or exceeded so that an association is valid. Otherwise, the measurement is discarded as a noise measurement ("clutter").

Using a suitable standardization, for example, taking the distribution of the modality-specifically defined distance measure on a sample into account (the distribution, for example, also being a function of the threshold value of the association), thus yields the quality measure, which is typically between 0 and 1.

Measuring points of the point cloud of a LIDAR sensor are typically located on the surface of an object. For this reason, it is meaningful in this case to define the shortest Euclidean distance of the 3D measuring point to the surface of the 3D object model such as, for example the 3D bounding box, as the distance metric for each LIDAR measuring point associated with an object. The distance measure for the object overall may then be calculated as the average distance of all associated points.

When utilizing a distance metric for calculating the quality measure from RADAR locations, the approach may, in principle, be similar to that used with LIDAR. In this case, it should be noted, however, that RADAR locations are typically not measured on the surface of the objects. A possible distance metric may therefore be defined by initially estimating or modelling the distribution of the RADAR locations on the object, ideally, as a function of relevant parameters, such as a position of the measured object relative to the sensor, of a distance to the sensor, and of the type of the object. This distribution estimate may be based on a suitable sample. Since in the case of RADAR location measurements as opposed to LIDAR point measurements, an estimated value for the velocity is present, this attribute of the measurement may also be included in the calculation of the metrics, both in terms of the association and also in terms of the calculation of the quality measure.

In LIDAR systems, in particular, but also in RADAR systems, it is meaningful to also include the number of the measured points. A lower number of measured points, as is to be expected taking the distance to the object into account, may then result in a deterioration of the quality measure. A combination of a metric based on the number of points and the above-described distance metric is possible.

According to one aspect of the present invention, it is provided that the metric is based on an object detection rate of at least one sensor of the plurality of sensors, such as a false-positive rate and/or a false-negative rate and/or a combined rate such as a mean average precision and/or an F1 measure.

Further metrics may be used if of the individual modalities, object estimates, in addition to the raw measured data, are present which, for example, are ascertained from the raw measured data with the aid of algorithms for object detection and tracking.

In this case, an association of the objects of a particular modality with the ground truth objects enables the calculation of the following metrics:

The false-positive rate (also "fall-out") indicates the proportion of objects detected by the sensor, for which no ground truth object is present. The value is 0 if none of the detected objects represents a false-positive, and 1 if an actual ground truth object corresponds to none of the detected objects.

Conversely, the false-negative rate (also "miss rate") indicates how high the proportion of ground truth objects not detected by the sensor is to the total number of all objects actually present. The false-negative rate is 0 if there are no such objects, and 1, if none of the objects actually present is detected by the sensor.

The F1 score is the harmonic mean of precision and recall, thus, takes both false positives as well as false negatives into account.

The precision indicates which proportion of the objects detected by the sensor is correct (precision=1−false-positive rate), whereas the recall (also sensitivity) indicates the proportion of correctly detected objects actually present (recall=1−false-negative rate).

The mean average precision (mAP) also combines precision and recall to form a single value, however, it is also taken into account that precision and recall are related to one another insofar as an object detector may be optimized for the precision if a deterioration of the recall is accepted and vice versa. The mAP may only be determined if one confidence value each is present for the objects determined by the detector. In this case, the mean value of the precision is calculated, which results for all recall values from 0 to 1 if the confidence value is varied.

According to one aspect of the present invention, it is provided that the association is determined with the aid of a probability that the data sets belong to a certain object of the surroundings.

In accordance with an example embodiment of the present invention, a method is provided for determining a respective quality grade of one data set each of at least two sensors of a plurality of sensors using a machine learning model trained according to the example method(s) described above, the plurality of the sensors being configured to generate surroundings representations, and the trained machine learning model being provided with the data sets of the at least two sensors as an input signal, and the machine learning model provides an output variable for outputting the quality grade.

The term data set encompasses here both a single datum of a sensor if, for example, the sensor outputs only one value, as well as a, for example, two-dimensional or multi-dimensional field of values, for example, of sensors, which record a digital image of the surroundings, as well as all further amounts of data that represent a typical output variable for the respective sensor type.

An output variable of the machine learning model is a function of the machine learning model used. The output variable for a neural network may, in particular, be a quality grade.

With the aid of a corresponding machine learning model trained according to the method described, it is possible in a simple manner to provide each data set of a sensor of a plurality of sensors with a quality grade together with the data set.

In accordance with an example embodiment of the present invention, a method is provided for fusing data sets of sensors of a plurality of sensors, the plurality of sensors being configured to generate surroundings representations, and the data sets weighted with a respectively determined quality grade being incorporated during the fusion of the data sets of the sensors into the overall result of the surroundings identification.

The fusion may, in particular, be used both to identify as well as to fuse the pieces of information or the data sets. In this context, the method for fusing data sets of sensors of a plurality of sensors may be understood to mean a method for identifying and fusing data sets of sensors of a plurality of sensors.

As described above, it is advantageous to provide the instantaneous quality measure for the individual sensor modalities in addition to the sensor data themselves as an input to the module for the sensor data fusion and surroundings perception (MSFU). The MSFU may also be implemented using machine learning methods, it may, however, also be implemented using conventional algorithms (with the aid of "manual engineering"), for example, with the aid of a Kalman filtering of the sensor data. Compared to a system implemented exclusively with the aid of ML methods, the combination of an ML-based reliability determination of the sensors and a separate module for generating the surroundings representation has several advantages.

For example, it is an advantage that in a non-ML-based implementation of the sensor data fusion and surroundings perception, the requirement of the total system for computing power and memory capacity is lower from the outset or may be reduced even more, and it is thus more readily possible to implement the entire system on computer hardware, which is suitable for the mobile deployment in a robot or in a vehicle.

In this connection, it is possible to operate the ML-based reliability determination at a lower update rate and/or with only a portion of the multimodal sensor data, whereas the module for the sensor data fusion and surroundings perception is operated at a higher update rate and/or utilizes all the available sensor data.

On the one hand, a high degree of accuracy and low latency of the surroundings perception may be achieved in this way, on the other hand, the automatic assessment of the reliability of the sensors may utilize the advantages of machine learning methods in order to take the complex connections between the data of multimodal sensors at a multitude of conditions into account, which is not reliable or less reliable or not possible with non-ML-based methods for a similarly large number of different conditions, as they are able to be detected via a training sample.

An implementation of the MSFU, which is separate from the implementation of the module for determining the sensor quality measure, may also have the advantage that the entire system is implementable in a smaller and/or more cost-efficient manner.

For example, it may be sufficient, in the case of applications in which a redundant design is required due to the requirements of reliability, if the MSFU but not the module for determining the quality measure is redundantly designed.

In this case, the MSFU may be implemented in such a way that in the event of a failure of the module for determining the quality measure, it continues to process the multimodal sensor data, even though the quality measure of the sensors is no longer present. In this case, for example, a weighting during the fusion is dispensed with or a weighting is carried out using permanently pre-set parameters. The overall reliability of the MSFU output is thus lower and no overall quality is present. If this may be appropriately considered in the function, the safety of the system is still ensured so that a non-redundant designing of the module for determining the sensor quality measure is sufficient.

One example of the appropriate consideration in the function may be to initiate a handover to the human driver in the event of a failure of the module for determining the quality measure, so that the then less reliable pieces of information about the surroundings need still only be utilized for a limited period of time.

The assessments of the instantaneous reliability of each individual sensor that are output by a module for determining the quality measure may, for example, be used by a module for the sensor data fusion and surroundings perception, in order to improve the accuracy and reliability of the surroundings perception. This increases the safety of the system of autonomous driving.

One specific example of how the reliability assessment may be utilized is to include a weighting into the fusion of the sensor data, the data of the sensors more reliable at the respective point in time being weighted higher, and are thus incorporated more heavily into the overall result of the surroundings identification than the data of the sensors assessed as less reliable.

The improvement as compared to the conventional systems described above is achieved by the present invention in that additional pieces of information are available for the sensor data fusion due to the assessment of the quality of the individual sensors. As a result thereof, a mitigation of the deficiencies adapted to the respective situation takes place and a better identification accuracy and identification reliability is achieved at different operating conditions and surroundings conditions and, accordingly with differently conditioned deficiencies of the sensors.

One example is to adapt the autonomous driving function of a vehicle to the total assessment and thus to the instantaneous, estimated accuracy and reliability of the surroundings perception. One specific example is, in the case that the reliability or accuracy is assessed overall as poorer (if, for example, the quality assessments of all sensors are below a particular threshold value), to reduce the velocity of the autonomously driving vehicle until the overall reliability or accuracy has increased again. A further specific example is to request a handover to the human driver, i.e., to end the autonomous function in the event of an overall reliability no longer assessed as sufficient.

According to one aspect of the present invention, it is provided that the quality measure of the individual sensors is combined to form an overall assessment.

A consideration of the overall assessment for controlling an at least semi-automated mobile platform may also enhance the safety of the function.

In accordance with an example embodiment of the present invention, a method is provided in which a control signal for activating an at least semi-automated vehicle is provided based on a value of at least one quality grade of at least one sensor of a plurality of sensors; and/or a warning signal is provided for alerting a vehicle occupant based on a value of at least one quality grade of at least one sensor of a plurality of sensors.

The term "based on" is to be broadly understood with respect to the feature that a control signal is provided based on a value of at least one quality grade. It is to be understood in the sense that the value of at least one quality grade is used for any determination or calculation of a control signal, it not being ruled out that still other input variables may also be used for this determination of the control signal. This applies similarly also to the warning signal.

A mobile platform may be understood to mean an at least semi-automated system, which is mobile, and/or a driver assistance system of a vehicle. One example may be an at least semi-automated vehicle or a vehicle including a driver assistance system. This means, an at least semi-automated system in this context includes a mobile platform with respect to an at least semi-automated functionality, but a mobile platform also includes vehicles and other mobile machines, including driver assistance systems. Further examples of mobile platforms may be driver assistance systems including multiple sensors, mobile multi-sensor robots such as, for example, robot vacuum cleaners or lawn mowers, a multi-sensor monitoring system, a manufacturing machine, a personal assistant or an access control system. Each of these systems may be a fully automated or semi-automated system.

In accordance with an example embodiment of the present invention, a device is provided, which is configured to carry out a method as described above. With such a device, it is possible to easily integrate the method into different systems.

In accordance with an example embodiment of the present invention, a computer program is specified, which includes commands which, when the computer program is executed by a computer, prompt the computer to carry out one of the above-described methods. Such a computer program enables the use of the described method in different systems.

In accordance with an example embodiment of the present invention, a machine-readable memory medium is provided, on which the above-described computer program is stored.

BRIEF DESCRIPTION OF THE DRAWINGS

Exemplary embodiments of the present invention are depicted and explained in greater detail below with reference to the FIGS. 1 and 2.

DETAILED DESCRIPTION OF EXAMPLE EMBODIMENTS

Figure 1:
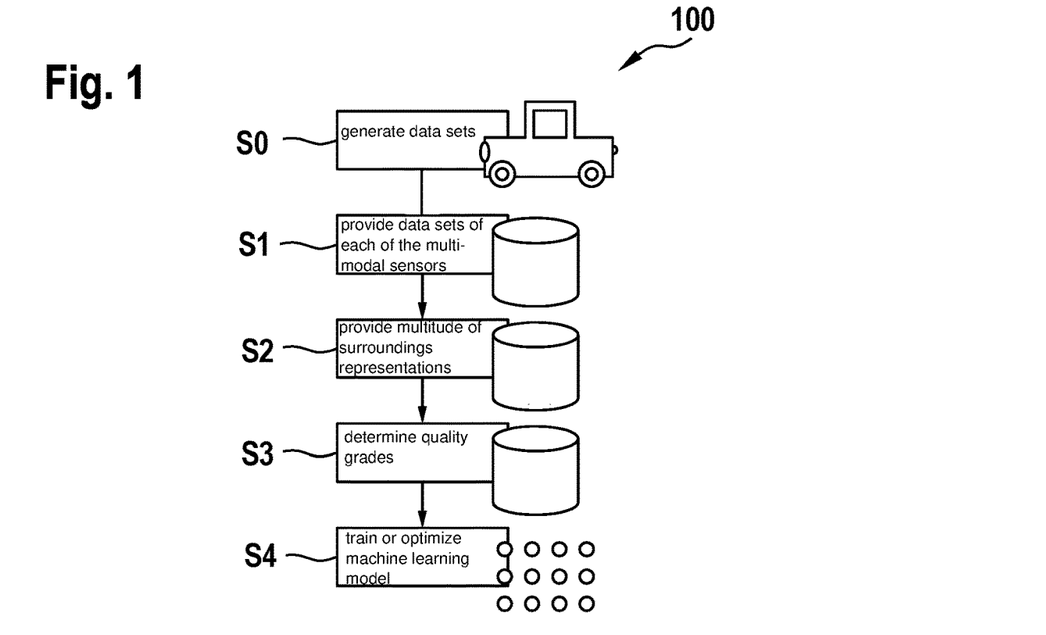
FIG. 1 shows a flowchart for training a machine learning model, in accordance with an example embodiment of the present invention.

FIG. 1 shows a flowchart of a method 100 for training a machine learning model for determining a quality grade of data sets 23 from each of a plurality of sensors 21. In a step S0, data sets 23 (sensor raw measured data) are generated in advance by each of a plurality of sensors 21, the plurality of sensors 21 being configured to generate raw measured data, from which a surroundings representation may be determined.

This plurality of sensors 21 may, for example, be a vehicle equipped with the plurality of sensors 21 or a fleet of vehicles thus equipped.

In a step S1, a multitude of data sets 23 of each of the plurality of multimodal sensors 21 is provided by a corresponding multitude of surroundings representations. This means, therefore, that the plurality of multimodal sensors 21 has generated a multitude of data sets 23 corresponding to a multitude of surroundings representations, which are provided in this step in order to obtain a so-called unlabeled sample of data sets 23 of each of the plurality of multimodal sensors 21.

In a further step S2, the multitude of surroundings representations are provided with attribute data of ground truth objects. This may take place, for example, by manually labeling or with the aid of a holistic processing of data sets 23 of each of the plurality of multimodal sensors 21, in order to obtain a so-called labeled sample of data sets 23 of each of the plurality of multimodal sensors 21. The attribute data represent in each case a symbolic description of the respective surroundings representation.

In a further step S3, a quality grade 26a, 26b, 26c, 26d of respective data set 23 of each of the plurality of sensors 21 is determined with the aid of a metric according to one of the methods described above. In this step, these quality grades 26a, 26b, 26c 26d may vary as a function of respective data set 23 in such a way that in a temporal sequence of data sets 23, resulting quality grades 26a, 26b, 26c, 26d of the individual sensors are time-dependent, since they characterize the quality of the sensor data of the respective sensor at a particular point in time.

In one further step S4, the machine learning model is trained or optimized using the multitude of data sets 23 of each of the plurality of sensors 21 and respectively assigned determined quality grade 26a, 26b, 26c, 26d of respective data set 23 of each sensor 21.

Figure 2:
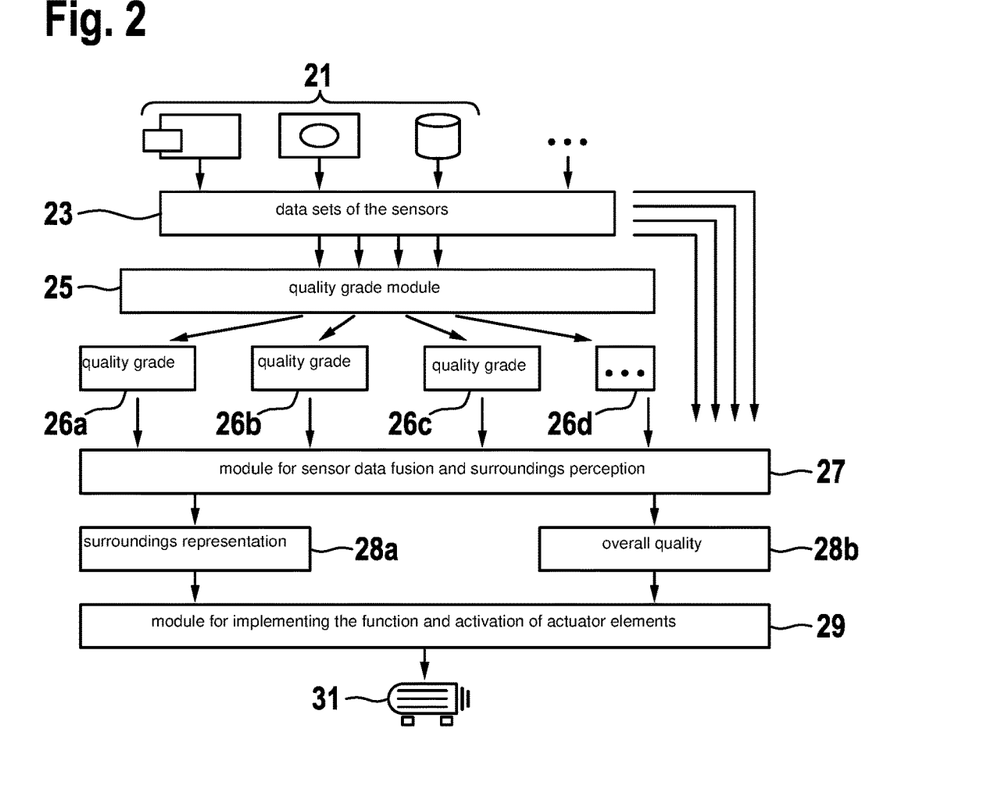
FIG. 2 shows a method for fusing data sets of a plurality of sensors and for an activation of actuating elements, in accordance with an example embodiment of the present invention.

FIG. 2 schematically shows a sequence from a generation of data sets 23 with the aid of a plurality of multimodal sensors 21 to the implementation of possible functions and activation of actuator elements 31, for example, for an at least semi-automated mobile platform or for implementing a semi-autonomous driving function of a driver assistance system in a vehicle or for implementing a fully-autonomous driving function in a vehicle.

In this case, a plurality of sensors 21 is configured to generate data sets 23 for a surroundings representation. These sensors 21 in this case may have different modalities, i.e., may represent different sensor types 21 such as, for example, optical cameras, RADAR systems, LIDAR systems or ultrasonic sensors and are combined to form a multimodal sensor set.

These data sets 23 represent the input data for a module 25, which determines for each of these data sets 23 for each of the plurality of sensors 21 an instantaneous quality grade 26a, 26b, 26c, 26d based on instantaneously present data sets 23 of the plurality of multimodal sensors 21 using a machine learning model trained in accordance with the above-described method such as, for example, a deep neural network (DNN) trained in this way.

In addition to data sets 23, these quality grades 26a, 26b, 26c, 26d are provided to an input of a module for sensor data fusion and surroundings perception (MSFU) 27.

MSFU module 27 uses these quality grades 26a, 26b, 26c, 26d of data sets 23 of the plurality of multimodal sensors 21 within the scope of the identification and fusion of data sets 23 of the plurality of multimodal sensors 21, for example, by a weighting of the surroundings representations of the respective data sets determined from data sets 23 within the scope of the fusion, in order to be able to ensure an accuracy and/or reliability of surroundings representation 28a generated by MSFU module 27, even in the case of erroneous data sets 23 due, for example, to sensor deficiencies.

An overall quality 28b may also be determined, which indicates the reliability of the generated surroundings representation, taking all quality grades 26a, 26b, 26c, 26d of data sets 23 of the plurality of multimodal sensors 21 into account.

Both surroundings representation 28a as well as overall quality 28b are provided to an input of a module 29 for implementing the function and activation of actuator elements 31.

This module 29 is able to implement the function with improved performance and a higher degree of reliability than is possible with conventional methods because, on the one hand, the reliability of surroundings representation 28a is improved with the method described herein and because, on the other hand, overall quality 28b is available as additional information. Overall quality 28b may, for example, be used in order to adapt the design of an at least semi-automated driving function to instantaneous quality grades 26a, 26b, 26c, 26d of data sets 23 of the plurality of multimodal sensors 21, i.e., to specify a more defensive driving mode, for example, at a lower available velocity with poorer overall quality 28b of surroundings representation.

Overall quality 28b may also be used to decide when an autonomous or semi-autonomous driving function may no longer be available, so that a handover must be made to the human driver, for example, by comparing overall quality 28b with a threshold value.

What is claimed is:

1. A method for training a machine learning model for determining quality grades of data sets from each of a plurality of sensors, the plurality of sensors being configured to generate surroundings representations, wherein each of the plurality of sensors is configured to sense an environment using a respective sensing modality for generating a respective one of the data sets and the quality grade is a measure of an accuracy with which the respective one of the sensors that has generated the respective data set is to perform its sensing of the environment using the respective sensor's respective sensing modality in a current state, the method comprising the following steps:

providing a multitude of training data sets of each of the plurality of the sensors, wherein the multitude of training data sets correspond to a multitude of the surroundings representations, the multitude of training data sets including at least two data sets generated by two different ones of the plurality of sensors simultaneously sensing overlapping fields of view, the respective sensing modalities of the two different ones of the plurality of sensors being different than each other;

providing attribute data of ground truth objects, which are labels describing characteristics of the multitude of surroundings representations;

determining a quality grade of each respective training data set of each respective sensor of the plurality of sensors using a metric, the metric comparing at least one variable, which is determined using the respective training data set, with at least one attribute datum of at least one associated one of the ground truth objects of a respective one of the surroundings representations; and training the machine learning model using the multitude of training data sets of each of the plurality of the sensors and the respectively determined quality grades to, in the future, determine quality grades of future data sets from the plurality of sensors without use of ground truth objects;

wherein:

the training includes an automatic iterative modification of the machine learning model, the multitude of training data sets being a single input data set upon which the iterative modification of the machine learning model is performed in combination; and the training is performed such that, after the training, the machine learning model is configured to operate on the future data sets, obtained simultaneously by the two different ones of the plurality of sensors as a single machine learning model input, in combination to assign respective quality grades to each of the future of data sets, with different ones of the future data sets, included as the single machine learning model input, affecting the quality grade assignments of one another by the trained machine learning model.

2. The method as recited in claim 1, wherein the machine learning model includes a neural network or a recurrent neural network, and a respective output variable of the machine learning model is a vector, which includes at least one vector element that specifies the quality grade of the data sets.

3. The method as recited in claim 2, wherein the neural network includes multiple layers of nodes, the single machine learning model input is applied simultaneously into different nodes of an input layer of the multiple layers of the neural network, and the data sets of the at least two sensors are linked by addition, averaging, or concatenation in another layer of the multiple layers of the neural network using a single node of the other layer whose input is based on a combination of the data sets of the at least two sensors.

4. The method as recited in claim 1, wherein an operation for fusing the at least two data sets takes place using addition, averaging, or concatenation of the at least two data sets.

5. The method as recited in claim 1, wherein at least one sensor of the plurality of sensors generates data sets which include a temporal sequence of data of the at least one sensor.

6. The method as recited in claim 1, wherein the metric for determining the quality grade is a function of the respective modality of the respective sensor.

7. The method as recited in claim 1, wherein the comparison includes the following steps:

associating the at least one variable of the respective training data set of the respective sensor with at least one object of the associated ground truth surroundings representation; and determining a quantitative match of the at least one variable with at least one attribute of the ground truth object of the surroundings representation using the metric as a function of the modality of the respective sensor, to determine the quality grade of the respective training data set.

8. The method as recited in claim 1, wherein the metric is based on an object detection rate of at least one sensor of the plurality of sensors.

9. The method as recited in claim 1, wherein the object detection rate includes at least one of a false-positive rate, a false-negative rate, a mean average precision, and an F1 measure.

10. The method as recited in claim 7, wherein the association is determined using a probability that the respective training data set belongs to a certain object of the surroundings.

11. A method that applies respective new data sets of each of at least two sensors of a plurality of sensors of a machine to a trained machine learning model, the plurality of the sensors being configured to generate surroundings representations, wherein each of the plurality of sensors is configured to sense an environment using a respective sensing modality for generating a respective one of the data sets and the quality grade is a measure of an accuracy with which the respective one of the sensors that has generated the respective data set is to perform its sensing of the environment using the respective sensor's respective sensing modality in a current state, the machine learning model being trained by providing a multitude of training data sets of each of the plurality of the sensors, wherein the multitude of training data sets correspond to a multitude of the surroundings representations, providing attribute data of ground truth objects, which are labels describing characteristics of the multitude of surroundings representations, determining a quality grade of each respective training data set of each respective sensor of the plurality of sensors using a metric, the metric comparing at least one variable, which is determined using the respective training data set, with at least one attribute datum of at least one associated one of the ground truth objects of a respective one of the surroundings representations, and training the machine learning model using the multitude of training data sets of each of the plurality of the sensors and the respectively determined quality grades to, in the future, determine quality grades of the new data sets from the plurality of sensors without use of ground truth objects, the method comprising:

during operation of the machine:

the each of the at least two sensors generating the new data sets;

providing the new data sets of the at least two sensors as an input signal to the trained machine learning model;

determining, by the trained machine learning model, respective quality grades for each of the new data sets based on the input signal; and generating an overall surroundings representation of an environment in which the machine is operating based on the new data sets and the respective quality grades; and the machine continuing the operation in a manner that is based on the generated overall surroundings representation;

wherein:

the multitude of training data sets include at least two data sets generated by two different ones of the plurality of sensors simultaneously sensing overlapping fields of view, the respective sensing modalities of the two different ones of the plurality of sensors being different than each other;

the machine learning model is one whose training included an automatic iterative modification of the machine learning model, the multitude of training data sets being a single input data set upon which the iterative modification of the machine learning model is performed in combination; and the determining of the respective quality grades is performed by the machine learning model operating on the new data sets, obtained simultaneously by the two different ones of the plurality of sensors as a single machine learning model input, in combination to assign respective quality grades to each of the new data sets, with different ones of the new data sets, included as the single machine learning model input, affecting the quality grade assignments of one another by the trained machine learning model.

12. The method as recited in claim 11, wherein the machine is an at least semi-automated vehicle, and the continued operation is performed by a control signal activating the at least semi-automated vehicle.

13. A device configured to perform a method to train a machine learning model for determining quality grades of data sets from each of a plurality of sensors, the plurality of sensors being configured to generate surroundings representations, wherein each of the plurality of sensors is configured to sense an environment using a respective sensing modality for generating a respective one of the data sets and the quality grade is a measure of an accuracy with which the respective one of the sensors that has generated the respective data set is to perform its sensing of the environment using the respective sensor's respective sensing modality in a current state, the method comprising the following steps:
  providing a multitude of training data sets of each of the plurality of the sensors, wherein the multitude of data sets corresponding to a multitude of training data sets of the surroundings representations, the multitude of training data sets including at least two data sets generated by two different ones of the plurality of sensors simultaneously sensing overlapping fields of view, the respective sensing modalities of the two different ones of the plurality of sensors being different than each other;
  providing attribute data of ground truth objects, which are labels describing characteristics of the multitude of surroundings representations;
  determining a quality grade of each respective training data set of each respective sensor of the plurality of sensors using a metric, the metric comparing at least one variable, which is determined using the respective training data set, with at least one attribute datum of at least one associated one of the ground truth objects of a respective one of the surroundings representations; and
  training the machine learning model using the multitude of training data sets of each of the plurality of the sensors and the respectively determined quality grades to, in the future, determine quality grades of future data sets from the plurality of sensors without use of ground truth objects;
  wherein:
    the training includes an automatic iterative modification of the machine learning model, the multitude of training data sets being a single input data set upon which the iterative modification of the machine learning model is performed in combination; and
    the training is performed such that, after the training, the machine learning model is configured to operate on the future data sets, obtained simultaneously by the two different ones of the plurality of sensors as a single machine learning model input, in combination to assign respective quality grades to each of the future of data sets, with different ones of the future data sets, included as the single machine learning model input, affecting the quality grade assignments of one another by the trained machine learning model.

14. A non-transitory machine-readable memory medium on which is stored instructions that are executable by a processor and that, when executed by the processor, cause the processor to perform a method for training a machine learning model for determining a quality grade of at least one data set from each of a plurality of sensors, the plurality of sensors being configured to generate surroundings representations, wherein each of the plurality of sensors is configured to sense an environment using a respective sensing modality for generating a respective one of the data sets and the quality grade is a measure of an accuracy with which the respective one of the sensors that has generated the respective data set is to perform its sensing of the environment using the respective sensor's respective sensing modality in a current state, the method comprising the following steps:
  providing a multitude of training data sets of each of the plurality of the sensors, wherein the multitude of training data sets correspond to a multitude of the surroundings representations, the multitude of training data sets including at least two data sets generated by two different ones of the plurality of sensors simultaneously sensing overlapping fields of view, t the respective sensing modalities of the two different ones of the plurality of sensors being different than each other;
  providing attribute data of ground truth objects, which are labels describing characteristics of the multitude of surroundings representations;
  determining a quality grade of each respective training data set of each respective sensor of the plurality of sensors using a metric, the metric comparing at least one variable, which is determined using the respective training data set, with at least one attribute datum of at least one associated one of the ground truth objects of a respective one of the surroundings representations; and
  training the machine learning model using the multitude of training data sets of each of the plurality of the sensors and the respectively determined quality grades to, in the future, determine quality grades of future data sets from the plurality of sensors without use of ground truth objects;
  wherein:
    the training includes an automatic iterative modification of the machine learning model, the multitude of training data sets being a single input data set upon which the iterative modification of the machine learning model is performed in combination; and
    the training is performed such that, after the training, the machine learning model is configured to operate on the future of data sets, obtained simultaneously by the two different ones of the plurality of sensors as a single machine learning model input, in combination to assign respective quality grades to each of the future of data sets, with different ones of the future data sets, included as the single machine learning model input, affecting the quality grade assignments of one another by the trained machine learning model.

15. The method as recited in claim 1, wherein an operation for fusing the at least two data sets takes place using addition, averaging, or concatenation of attributes of objects of the surroundings representations determined from the at least two data sets.

16. The method as recited in claim 11, wherein the generating of the overall surroundings representation includes differently weighting respective ones of the data sets based on the respective quality grades, the overall surroundings representation being determined based on a combination of the differently weighted data sets.

* * * * *